US011993970B2

(12) United States Patent
Gupta et al.

(10) Patent No.: US 11,993,970 B2
(45) Date of Patent: May 28, 2024

(54) WINDOW SYSTEM THAT HAS A PRESSURE-SENSITIVE MATERIAL AND AN ASSOCIATED OBJECT DETECTION METHOD

(71) Applicant: Ford Global Technologies, LLC, Dearborn, MI (US)

(72) Inventors: Ajeya Gupta, Canton, MI (US); Paul Candiago, Windsor (CA)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 17/676,433

(22) Filed: Feb. 21, 2022

(65) Prior Publication Data

US 2023/0265703 A1 Aug. 24, 2023

(51) Int. Cl.
*E05F 15/40* (2015.01)
*E05F 15/44* (2015.01)
*E05F 15/695* (2015.01)

(52) U.S. Cl.
CPC .......... *E05F 15/443* (2015.01); *E05F 15/695* (2015.01); *E05Y 2900/55* (2013.01)

(58) Field of Classification Search
CPC ............................ E05F 15/443; E05Y 2900/55
USPC ..................... 49/26, 27, 28; 200/61.43, 61.44
See application file for complete search history.

(56) References Cited

U.S. PATENT DOCUMENTS 4,683,349 A * 7/1987 Takebe ................. H01B 7/0009 174/113 C
5,801,347 A * 9/1998 Tsuge ..................... H01H 3/142 200/61.44
5,880,421 A * 3/1999 Tsuge .................... E05F 15/443 200/61.43
6,078,014 A * 6/2000 Kashiwazaki ......... H01H 3/142 200/61.43
6,246,194 B1 * 6/2001 Davies .................. E05F 15/443 49/27
6,563,107 B2 * 5/2003 Danisch ................. D07B 1/145 250/227.16
6,851,222 B2 * 2/2005 Albiero ................... E05F 15/44 49/27
7,055,885 B2 * 6/2006 Ishihara .................. E05F 15/44 200/61.43

(Continued)

FOREIGN PATENT DOCUMENTS

EP 1335093 A2 * 8/2003 .............. E05F 15/42
EP 3533964 B1 3/2021

(Continued)

OTHER PUBLICATIONS

Kim G, et al., Single-Layer Pressure Textile Sensors with Woven Conductive Yarn Circuit, Applied Sciences, 2020; 10(8):2877. https://doi.org/10.3390/app10082877.

*Primary Examiner* — Jerry E Redman

(74) *Attorney, Agent, or Firm* — Vichit Chea; Carlson, Gaskey & Olds, P.C.

(57) ABSTRACT

A window system includes a window that moves between a closed position and an open position, and a pressure-sensitive material disposed on an edge of the window. An object detection method includes moving a window from a more open position to a less open position, and during the moving, detecting an electrical parameter using a pressure-sensitive material.

17 Claims, 3 Drawing Sheets

(56) References Cited

U.S. PATENT DOCUMENTS

| | | | | |
|---|---|---|---|---|
| 7,150,179 | B2 * | 12/2006 | Takafuji | B60R 21/0136<br>73/12.09 |
| 7,513,166 | B2 * | 4/2009 | Shank | G01R 27/2605<br>73/780 |
| 8,395,474 | B2 * | 3/2013 | Tanba | H01C 10/10<br>338/114 |
| 9,202,644 | B2 * | 12/2015 | Aoyama | H01H 3/60 |
| 9,984,832 | B2 * | 5/2018 | Takaba | E05F 15/44 |
| 10,060,172 | B2 | 8/2018 | Schatz et al. | |
| 10,451,496 | B2 * | 10/2019 | Sugita | B32B 25/08 |
| 10,890,495 | B2 * | 1/2021 | Sugita | G01L 1/005 |
| 11,316,331 | B2 * | 4/2022 | Sakata | H02G 3/32 |
| 11,555,754 | B2 * | 1/2023 | Sugita | B29C 48/686 |
| 2003/0106377 | A1 * | 6/2003 | Ishihara | E05F 15/44<br>73/756 |
| 2007/0113477 | A1 * | 5/2007 | Matsushita | E05F 15/46<br>49/27 |
| 2009/0229851 | A1 * | 9/2009 | Thuot | H01B 13/142<br>174/107 |
| 2009/0295556 | A1 * | 12/2009 | Inoue | E05F 15/695<br>49/506 |
| 2011/0185819 | A1 * | 8/2011 | Hattori | E05F 15/44<br>29/595 |
| 2018/0202213 | A1 | 7/2018 | Shitara | |
| 2018/0364387 | A1 * | 12/2018 | Hattori | G01V 3/02 |
| 2020/0190888 | A1 * | 6/2020 | Aragai | E05F 15/695 |
| 2021/0148152 | A1 | 5/2021 | Murree | |
| 2023/0265703 | A1 * | 8/2023 | Gupta | E05F 15/695<br>49/28 |

FOREIGN PATENT DOCUMENTS

| | | | | | |
|---|---|---|---|---|---|
| JP | 5819500 | B1 | * | 11/2015 | E05F 15/44 |
| WO | WO-2016038906 | A1 | * | 3/2016 | E05F 15/44 |

* cited by examiner

WINDOW SYSTEM THAT HAS A PRESSURE-SENSITIVE MATERIAL AND AN ASSOCIATED OBJECT DETECTION METHOD

TECHNICAL FIELD

This disclosure relates generally to a vehicle window system that uses a pressure-sensitive material to detect objects.

BACKGROUND

Vehicles can include windows that move between closed and open positions. Some vehicles include systems that monitor areas near the window as the window is moved. The monitoring can, for example, help to avoid pressing the window against an object as the window moves to a closed position.

SUMMARY

In some aspects, the techniques described herein relate to a window system, including: a window that moves between a closed position and an open position; and a pressure-sensitive material disposed on an edge of the window.

In some aspects, the techniques described herein relate to a window system, wherein the pressure-sensitive material is a pressure-sensitive cord.

In some aspects, the techniques described herein relate to a window system, wherein the pressure-sensitive material includes at least two strands.

In some aspects, the techniques described herein relate to a window system, wherein the at least two strands are twisted.

In some aspects, the techniques described herein relate to a window system, further including a control module configured to stop a movement of the window in response to a change in a resistance value associated with the pressure-sensitive material.

In some aspects, the techniques described herein relate to a window system, wherein the control module is a door control module.

In some aspects, the techniques described herein relate to a window system, wherein the edge is exposed when the window is in an open position.

In some aspects, the techniques described herein relate to a window system, wherein the edge is unexposed when the window is in a closed position.

In some aspects, the techniques described herein relate to a window system, wherein the edge faces vertically upward.

In some aspects, the techniques described herein relate to a window system, wherein the pressure-sensitive material is electrically conductive.

In some aspects, the techniques described herein relate to a window system, wherein the pressure-sensitive material is electrically coupled to a door control module.

In some aspects, the techniques described herein relate to a window system, wherein the window is a door window.

In some aspects, the techniques described herein relate to a window system, further including a tube that holds the pressure-sensitive material.

In some aspects, the techniques described herein relate to an object detection method: moving a window from a more open position to a less open position; and during the moving, detecting an electrical parameter using a pressure-sensitive material.

In some aspects, the techniques described herein relate to an object detection method, further including stopping the moving based on the detecting.

In some aspects, the techniques described herein relate to an object detection method, wherein the electrical parameter is resistance.

In some aspects, the techniques described herein relate to an object detection method, wherein the moving is powered by a door control module.

In some aspects, the techniques described herein relate to an object detection method, wherein a resistance of the pressure-sensitive material changes in response to changes in pressure applied to the pressure-sensitive material.

In some aspects, the techniques described herein relate to an object detection method, wherein the less open position is a closed position.

In some aspects, the techniques described herein relate to an object detection method, wherein the pressure-sensitive material is disposed on an edge of the window, the edge unexposed when the window is in the closed position, the edge exposed with the window is in the open position.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows.

DETAILED DESCRIPTION

This disclosure details a window system that can use a pressure-sensitive material to detect an object. Detecting the object can prevent entrapping or pinching the object as the window is moved to a closed position. The pressure-sensitive material can be disposed along an edge of the window.

Figure 1:
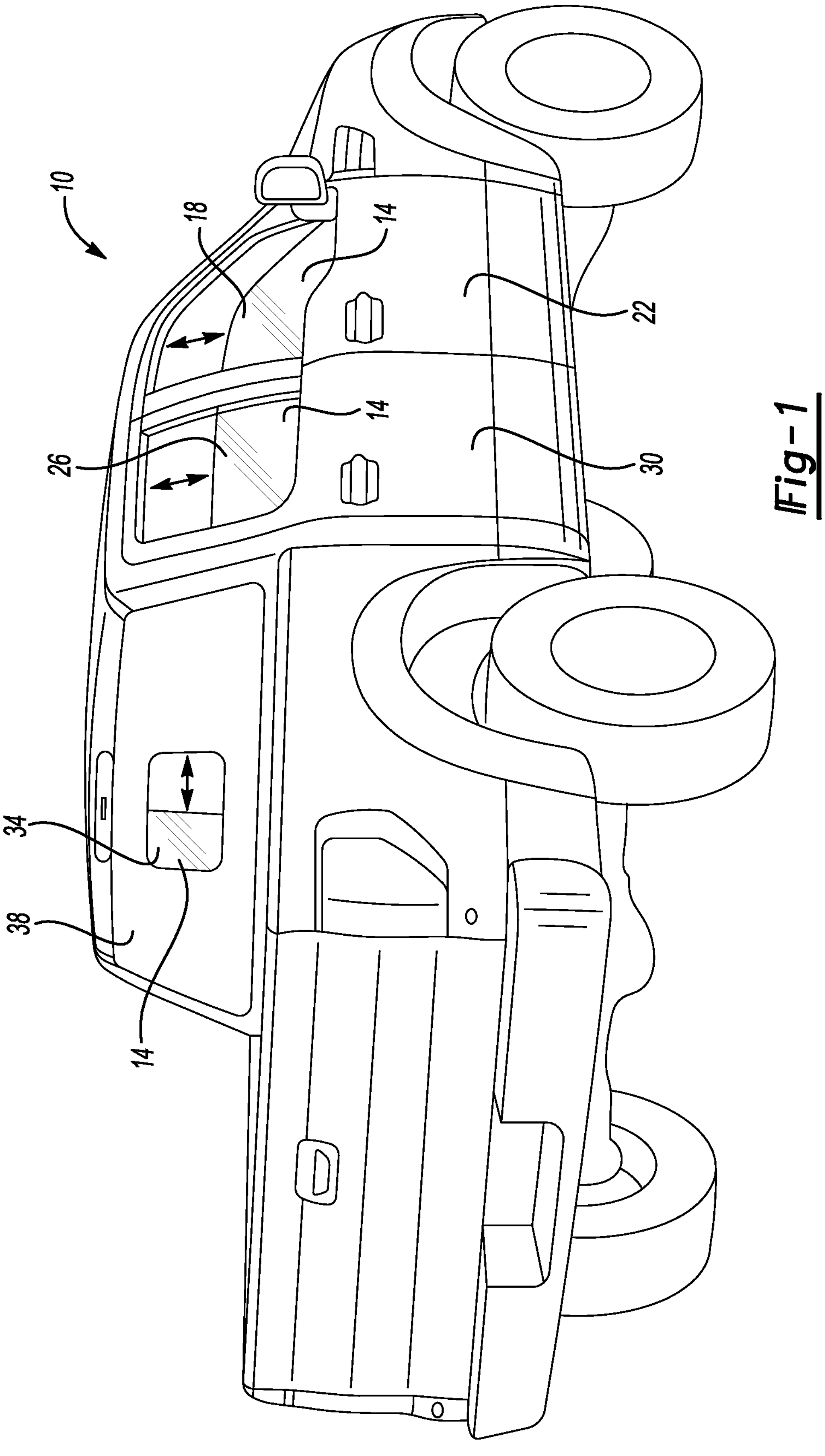
FIG. 1 illustrates a rear and side view of a vehicle having a plurality of windows between a closed position and open positions.

With reference to FIG. 1, an exemplary vehicle 10 includes a plurality of windows 14 that are each movable between respective open and closed positions. A front door window 18 is on a passenger side of the vehicle 10 and is held within a front door 22. A rear door window 26 is on the passenger side of the vehicle 10 and is held within a rear door 30. A rear cab window 34 is held within a back of a cab 38 of the vehicle 10.

Other vehicles can include other types of windows including, but not limited to, door windows on a driver side of the vehicle 10, and windows held within a top of the cab 38.

Figure 2:
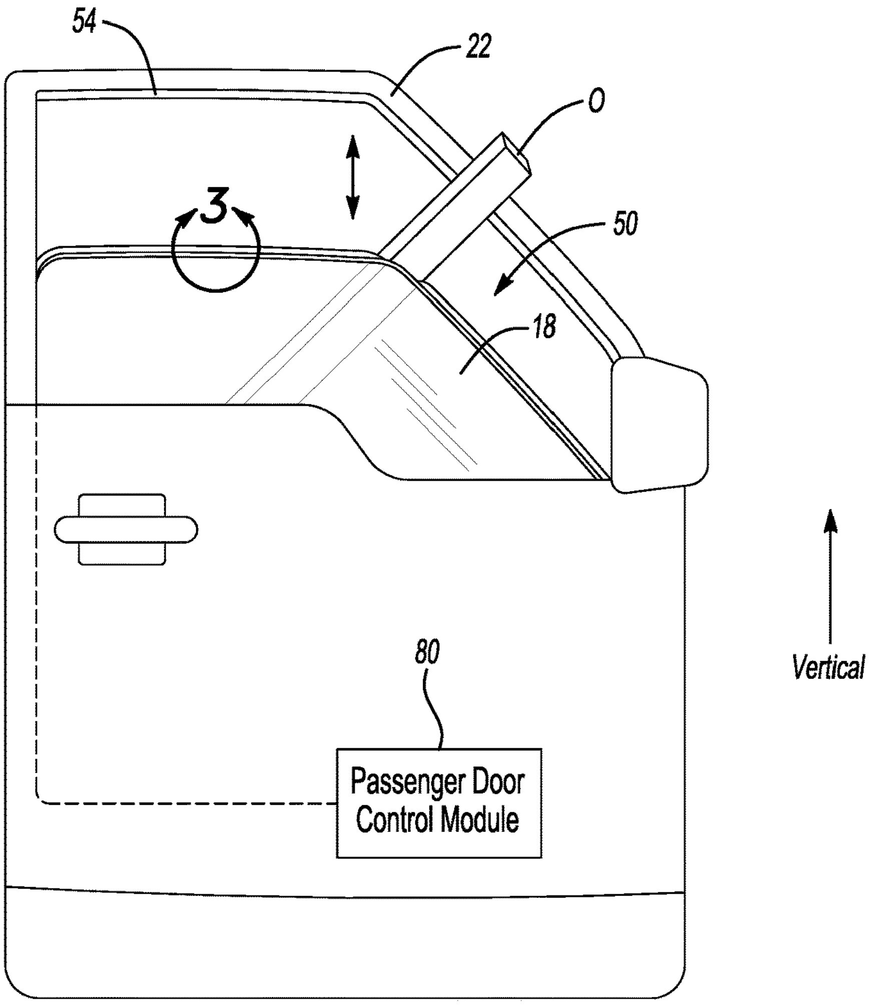
FIG. 2 illustrates a partially schematic side view of a passenger side door incorporating a window system having a window that moves between the closed position and the open positions along with a pressure-sensitive material disposed on an edge of the window.
Figure 3:
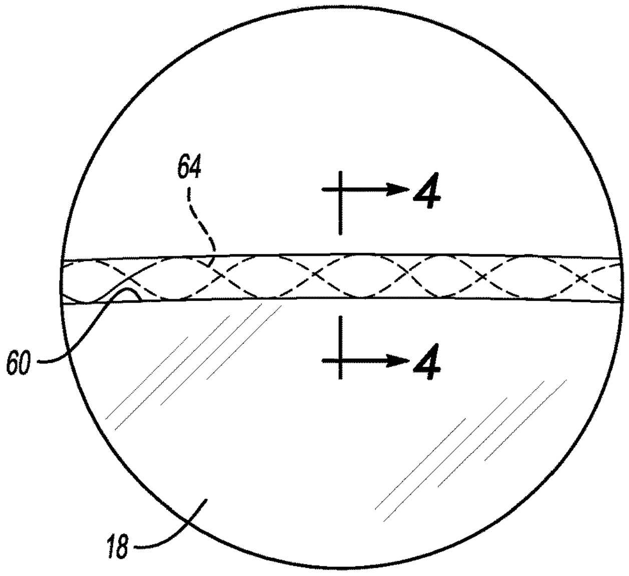
FIG. 3 illustrates a closeup view of area 3 in FIG. 2.
Figure 4:
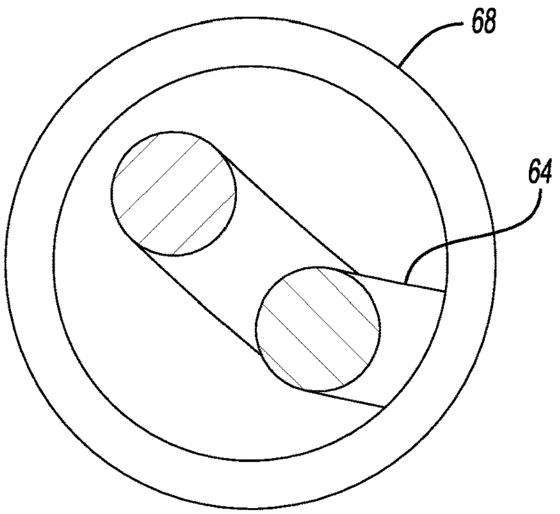
FIG. 4 illustrates a section view at line 4-4 in FIG. 3.
Figure 5:
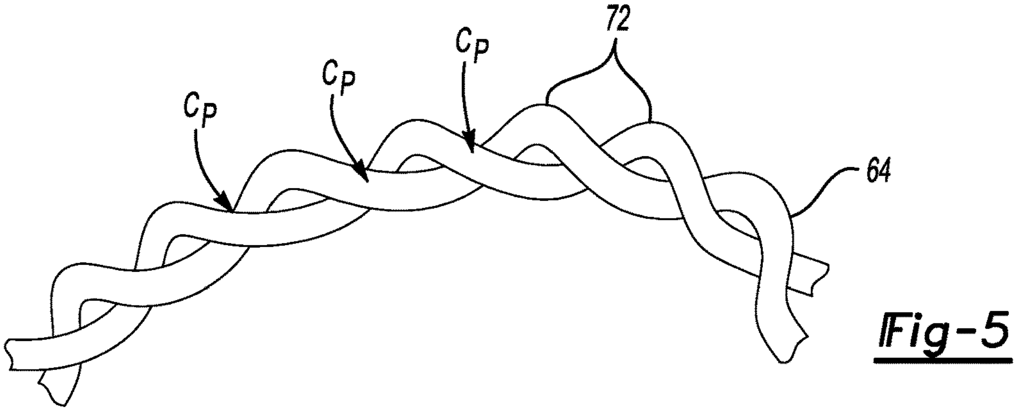
FIG. 5 illustrates a closeup perspective view of the pressure-sensitive material of FIGS. 2-4.

With reference now to FIGS. 2 and 3, the front door window 18 is shown in a partially open position, which provides a window opening 50 within the front door 22.

The front door window 18 can move vertically upward to move the window 18 to a less open position that reduces a size of the window opening 50. The front door window 18 can move vertically downward to move the window 18 to a more open position that increases a size of the window opening 50. Vertical for purposes of this disclosure is with reference to ground in a general orientation of the vehicle 10 when in operation. A user can control movement of the front door window 18 using switches, as is known.

The front door window 18 can be moved vertically upward into a closed position where the window 18 is received within a seal 54. The window opening 50 is closed when the front door window 18 is in the closed position.

In this example, at least an edge 60 of the window 18 is the portion of the window 18 that is received within the seal 54 when the window 18 is in the closed position. The edge 60 faces vertically upward and represents an uppermost surface of the window 18. The edge 60 extends from an inboard side of the front door window 18 to an outboard side of the front door window 18.

A pressure-sensitive material 64 is disposed on the edge 60 along a perimeter of the window 18. The pressure-sensitive material 64, in this example, is held within a protective tube 68, which can be a flexible Teflon material. The tube 68 can help to protect the pressure-sensitive material 64 from environmental conditions, such as rain.

The tube 68 can be adhesively secured directly to the edge 60 to hold the pressure-sensitive material 64 on the edge 60. When the window 18 is in the closed position, the pressure-sensitive material 64, along with the tube 68 and portions of the edge 60, can be received within the seal 54 to provide further protection.

The pressure-sensitive material 64 is, in this example, an electrically conductive, pressure-sensitive cord that includes two strands 72 twisted together or intertwined. The twisting of the strands 72 establishes various crossing points $C_P$, which is generally where the strands 72 contact each other. In another example, the strands 72 are braided or plaited to provide crossing points. The crossing points $C_P$ are along a length of the pressure-sensitive material 64.

Although the exemplary pressure-sensitive material 64 includes two strands 72, other examples could include more than two strands, such as three strands, four strands, or even eight strands. Incorporating more than two strands can provide greater numbers of crossing points $C_P$.

In this example, the pressure-sensitive material 64 is electrically and operably coupled to a control module, here a passenger door control module 80. A ribbon cable, for example, can be used to couple the pressure-sensitive material 64 to the control module 80. The ribbon cable can extend and retract to accommodate movement of the pressure-sensitive material 64 as the window 18 is raised and lowered. The control module 80 could be another module of the vehicle 10 in another example.

From the control module 80, electrical energy can be routed through the strands 72. The control module 80 can also monitor electrical parameters, such as resistance of the pressure-sensitive material 64. A power distribution box for the vehicle 10 can provide power to the control module 80 along with the control modules associated with other windows of the vehicle 10.

Resistance of the pressure-sensitive material 64 can change in response to changes in pressure applied to the pressure-sensitive material 64. The changes in pressure can be due to an object pressing down on the protective tube 68 and pressing the pressure-sensitive material 64. Because of the crossing points $C_P$, pressure applied to the pressure-sensitive material 64 changes resistance of the pressure-sensitive material 64. Increasing a number of crossing points $C_P$ can improve sensing and detection using the pressure-sensitive material 64. The control module 80 can sense changes in resistance.

When the window 18 is raised and contacts an object O, such as the piece of wood shown in FIG. 2, the object O applies pressure to the pressure-sensitive material 64. The object O could be something other than wood in other examples.

The control module 80 detects a change in the resistance due to the increase in pressure applied to the pressure-sensitive material 64. The control module 80 can stop the window 18 from further travel, which could pinch the object O between the window 18 and the seal 54 of the door 22.

Figure 6:
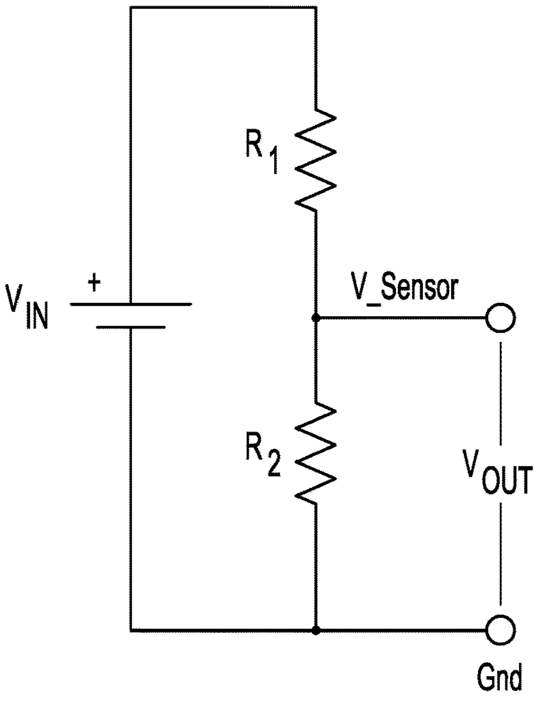
FIG. 6 schematically illustrates a circuit associated with the pressure-sensitive material and window of FIGS. 2-4.

Referring to FIG. 6, with continuing reference to FIGS. 1-5, $V_{IN}$ represents the supply voltage to the pressure-sensitive material 64, which can be 12V. $R_1$ is fixed, and $R_2$ is variable. $R_2$ changes resistance based on a force applied to the pressure-sensitive material 64. In FIG. 6, $R_1$ represents a resistance of one of the strands 72. $R_2$ represents a resistance of the other strand 72.

The pressure-sensitive material 64 has two leads V_Sensor. One of the leads is coupled to the control module 80, and the other connects to ground Gnd. V_Sensor changes based on the applied force because $R_2$ is changing when force is applied to the pressure-sensitive material 64. An output of the pressure-sensitive material 64, i.e., V_Sensor, can be received by the control module 80 for logic computations At the control module 80, or elsewhere, V_Sensor can be compared to a reference voltage. If V_Sensor is greater than the reference voltage, a processor transmit commands causing the window 18 to stop moving, even if an input from a switch indicates that the window 18 should be moving. If V_Sensor is equal to or less than the reference voltage, the window 18 can continue to move.

Although changes in resistance are monitored in this example, other electrical parameters could be measured in other examples. Changes in these other electrical parameters could be used to trigger stopping a movement of the window 18.

The pressure-sensitive material 64 can be used in connection with the window 18, as well as with other windows and other areas of the vehicle 10.

Features of the disclosed example include an object detection system utilizing a pressure-sensitive material that is secured to an edge of a window. An electrical parameter, such as resistance, can be monitored with respect to the pressure-sensitive material. Changes in the electrical parameter can be interpreted as the window moving against an object. Travel of the window can then be stopped to prevent pinching the object, which can damage the window, object, or other portions of the door.

The preceding description is exemplary rather than limiting in nature. Variations and modifications to the disclosed examples may become apparent to those skilled in the art that do not necessarily depart from the essence of this disclosure. Thus, the scope of protection given to this disclosure can only be determined by studying the following claims.

What is claimed is:

1. A window system, comprising:

a window that moves between a closed position and an open position; and a pressure-sensitive material disposed on an edge of the window, wherein the pressure-sensitive material includes at least two before pressure is applied strands that are in contact with each other twisted.

2. The window system of claim 1, wherein the pressure-sensitive material is a pressure-sensitive cord.

3. The window system of claim 1, further comprising a control module configured to stop a movement of the window in response to a change in a resistance associated with the pressure-sensitive material.

4. The window system of claim 3, wherein the control module is a door control module.

5. The window system of claim 1, wherein the edge is exposed when the window is in an open position.

6. The window system of claim 1, wherein the edge faces vertically upward.

7. The window system of claim 1, wherein the pressure-sensitive material is electrically conductive.

8. The window system of claim 1, wherein the pressure-sensitive material is electrically coupled to a door control module.

9. The window system of claim 1, wherein the window is a door window.

10. The window system of claim 9, further comprising a tube that holds the pressure-sensitive material.

11. The window system of claim 1, wherein the at least two strands are braided.

12. The window system of claim 1, wherein the at least two strands are plaited.

13. The window system of claim 1, wherein the at least two strands are twisted to establish a plurality of crossing points where the at least two strands are in contact with each other.

14. A window system, comprising:

a window that moves between a closed position and an open position;

a tube secured to an edge of the window;

at least one first strand of a pressure sensitive material, the at least one first strand disposed within the tube; and at least one second strand of the pressure sensitive material, the at least one second strand disposed within the tube, the at least one first strand intertwined with the at least one second strand to establish a plurality of crossing points where the at least one first strand contacts the at least one second strand before pressure is applied.

15. The window system of claim 14, wherein the at least one first strand is braided with the at least one second strand.

16. The window system of claim 14, wherein the tube is a Teflon tube.

17. The window system of claim 14, wherein the at least one first strand is twisted with the at least one second strand to establish the plurality of crossing points.

* * * * *